United States Patent [19]

Gerlowski

[11] Patent Number: 4,895,689

[45] Date of Patent: Jan. 23, 1990

[54] PROCESS FOR PREPARING HEAT TREATED SOLUTION CAST POLYKETONE-BASED BARRIER POLYMER MATERIALS

[75] Inventor: Leonard E. Gerlowski, Katy, Tex.

[73] Assignee: Shell Oil Company, Houston, Tex.

[21] Appl. No.: 128,967

[22] Filed: Dec. 4, 1987

[51] Int. Cl.$^4$ .................. B29C 39/00; B29C 71/02
[52] U.S. Cl. ................... 264/216; 264/204; 264/234; 264/237; 264/319; 264/331.15; 264/331.17; 264/345; 264/348
[58] Field of Search ............... 264/216, 204, 331.17, 264/331.15, 41, 49, 298, 234, 237, 319, 345, 348; 210/500.22, 500.27

[56] References Cited

U.S. PATENT DOCUMENTS

| | | | |
|---|---|---|---|
| 2,495,285 | 1/1950 | Hoehn | 260/28.5 |
| 3,689,460 | 9/1972 | Nozaki | 260/63 |
| 3,694,412 | 9/1972 | Nozaki | 260/63 |
| 3,876,738 | 4/1975 | Marinaccio et al. | 264/216 |
| 3,914,391 | 10/1975 | Nozaki | 423/364 |
| 4,247,498 | 1/1981 | Castro | 264/41 |

FOREIGN PATENT DOCUMENTS

| | | |
|---|---|---|
| 0121965 | 10/1984 | European Pat. Off. |
| 0181014 | 5/1986 | European Pat. Off. |
| 44-22617 | 9/1969 | Japan |
| 1081304 | 8/1967 | United Kingdom |

OTHER PUBLICATIONS

"Novel Palladium(II)-Catalyzed Copolymerization of Carbon Monoxide with Olefins", Sen & Li, J. Am. Chem. Soc., 1982, 104, 3520–3522.

Primary Examiner—Hubert C. Lorin

[57] ABSTRACT

A process for preparing a polymer material having improved oxygen and carbon dioxide barrier properties wherein a heated solution cast film, of a linear alternating polymer of carbon dioxide and at least one ethylenically unsaturated hydrocarbon, is cooled at a selected rate.

6 Claims, 1 Drawing Sheet

PROCESS FOR PREPARING HEAT TREATED SOLUTION CAST POLYKETONE-BASED BARRIER POLYMER MATERIALS

CROSS-REFERENCE TO SIMULTANEOUSLY FILED RELATED APPLICATIONS

"Melt Processed Polyketone-Based Barrier Polymer Materials" Leonard E. Gerlowski and John R. Kastelic, Ser. No. 128968; "Polyketone-Based Adhesives", Peter A. Kinneberg, Thomas A. Armer, Adriaan Wouter van Breen, Roger Edgar Charles Barton, and Ebel Kei, Ser. No. 128,952; and "Laminar Structures Prepared With Polyketone-Based Structural Adhesives", Peter A. Kinneberg and Thomas A. Armer, Ser. No. 128,972.

FIELD OF THE INVENTION

The invention relates to a polyketone-based film having oxygen and/or carbon dioxide barrier properties.

BACKGROUND OF THE INVENTION

The general class of polymers of carbon monoxide and one or more ethylenically unsaturated hydrocarbons has been known for some years. Brukaker, U.S. Pat. No. 2,495,285, produced such polymers of relatively low carbon monoxide content in the presence of free radical catalysts such as benzoyl peroxide. British Pat. 1,081,304 produced such polymers of higher carbon monoxide content in the presence of alkylphosphone complexes of palladium as catalyst. Nozaki extended the process to arylphosphone complexes of palladium; see, for example, U.S. Pat. No. 3,694,412, also see U.S. Pat. No. 3,914,391.

More recently, the class of linear alternating polymers of carbon monoxide and unsaturated hydrocarbons, now known as polyketones, has become of greater interest, in part because of improved methods of production. Such methods are shown by European Patent Applications 0,181,014 and 0,121,965. The disclosed processes employ, inter alia, a compound of a Group VIII metal such as palladium, an anion of a non-hydrohalogenic acid having a pKa below 2 and a bidenatate ligand of phosphorus. The resulting polymers are generally high molecular weight thermoplastic polymers having utility in the production of articles such as containers for food and drink.

There are a variety of methods for preparing polyketones, copolymers of an olefinically unsaturated compound and carbon monoxide. U.S. Pat. No. 3,689,460 and 3,694,412 disclose two processes for preparing polyketones. The catalysts described therein are complexes of a palladium, chloride or allyl palladium chloride and two trihydrocarbyl phosphine monodentate-like ligands, such as triphenylphosphine. However, in these disclosed processes the polymer yields are relatively small, less than 35 grams per gram palladium per hour at a pressure of 70 bar. A need has existed to devise a process with a higher yield.

Another process for preparing polyketones is discussed by Sen and Li in an article entitled "Novel Palladium (II)-Catalyzed Copolymerization of Carbon Monoxide With Olefins", J. Am. Chem. Soc. 1982, 104, 3520-3522. This process generates higher yield than the other disclosed processes.

The process for preparing polyketones disclosed in European Patent Application No. 0121965 is directed towards a preparation of polyketones to obtain a high yield, by polymerizing a mixture of carbon monoxide and alkenically unsaturated hydrocarbon in the presence of a Group VIII metal catalyst containing ligands, wherein hydrocarbon groups are bonded to an element from Group Va, characterized in that, as catalyst, a complex compound is used that is obtained by reacting a palladium, cobalt or nickel compound, a bidentate ligand of the general formula:

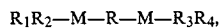

$$R_1R_2\text{—M—R—M—}R_3R_4,$$

in which M represents phosphorous, arsenic or antimony, $R_1$, $R_2$, $R_3$, and $R_4$ are identical or different hydrocarbon group, and R represents a divalent organic bridging group having at least two carbon atoms in the bridge, none of these carbon atoms carrying substituents that may cause stearic hindrance, and an anion of an acid with a pKa of less than two, provided the acid is neither a hydrohalogenic acid nor a carboxylic acid.

Polyketones prepared by the above-described novel high yield process can be treated wit one or more of a variety of solvents to produce solution cast films with barrier properties relative to the transmission of oxygen and carbon dioxide.

SUMMARY OF THE INVENTION

This invention relates to solution cast materials, for example films, sheets, or coatings having barrier properties prepared from a linear alternating polymer of carbon monoxide and at least one ethylenically unsaturated hydrocarbon as well as to the process for preparing these materials.

DESCRIPTION OF THE INVENTION

Figure 1:
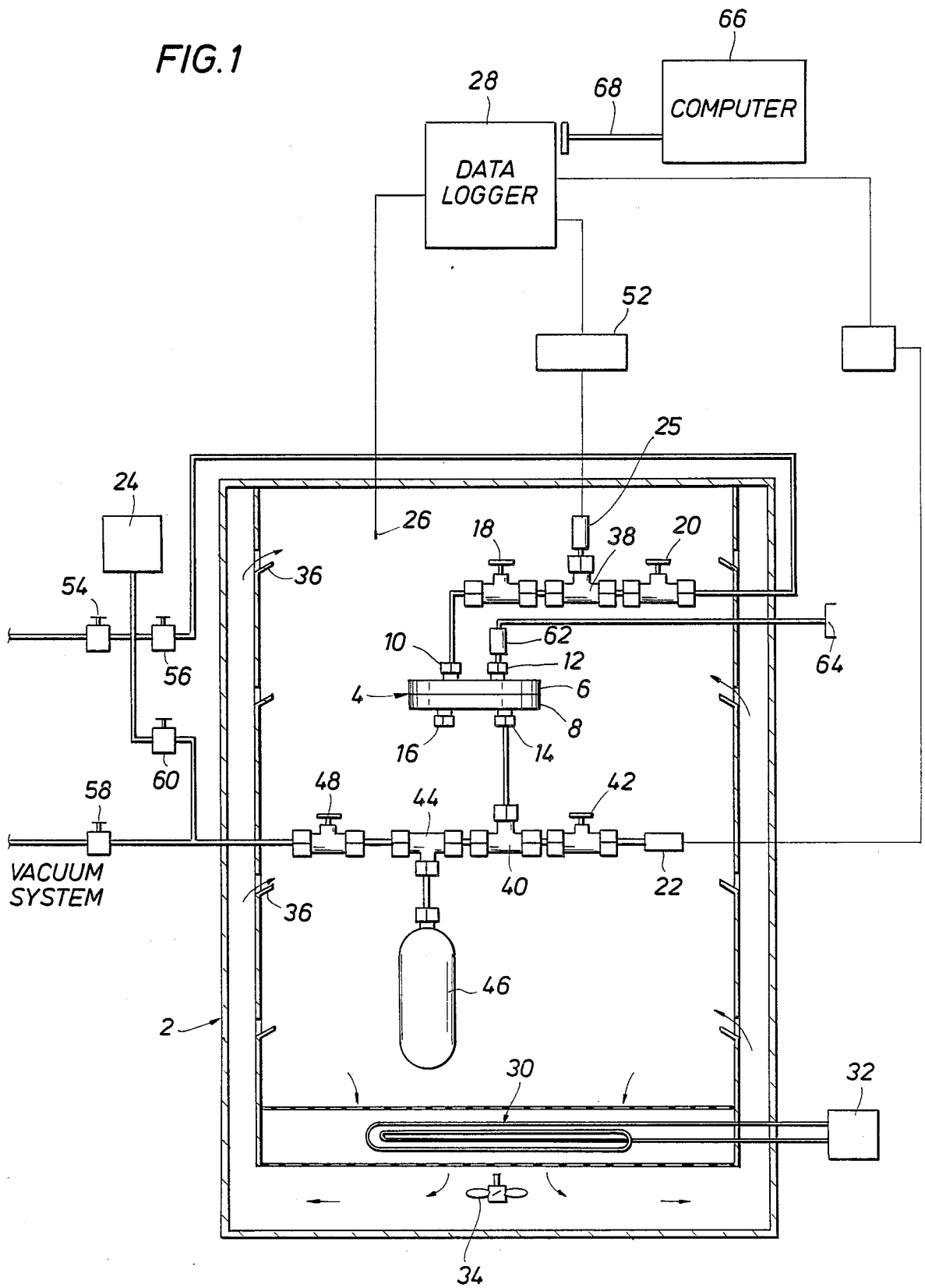
FIG. 1 is a diagram of the diffusion cell used to test the barrier properties of the novel polymer prepared herein.

Preferred polyketone polymers are copolymers of carbon monoxide and ethylene or terpolymers of carbon monoxide, ethylene and a second aliphatic α-olefin of 3 or more carbon atoms, particularly propylene.

The physical properties of the polymer are determined in part by the molecular weight and in part by whether the polymer is a copolymer or a terpolymer.

Of particular interest are those polymers of molecular weight from about 1,000 to 200,000, particularly those of molecular weight from about 10,000 to about 50,000, and containing substantially equimolar quantities of carbon monoxide and ethylenically unsaturated hydrocarbon. Molecular weights for these polymers are determined by conventional NMR testing methods.

Useful polyketones for the novel films have limiting viscosity numbers (LVN) as measured by the method wherein the polymer is dissolved in metacresol at 60° C., using a standard capillary viscosity measuring device, such as a Cannon-Ubbelohde viscometer in the range of 0.5 to 10 LVN and more preferably 0.8 to 4 LVN and most prefereably 0.8 to 2.5 LVN.

Polyketone polymers usable herein have preferred melting points of between about 210°-260° C. though polymers with melting point ranging from about 180° to 280° C. may be usable herein.

Such polymers are typically produced by contacting the carbon monoxide and the ethylenically unsaturated hydrocarbon(s) under polymerization conditions in the presence of a catalytic amount of a catalyst formed from a compound of the Group VIII metals palladium, cobalt or nickel, the anion of a non-hydrohalogenic acid of a pKa less than about 6, preferably less than about 2, and a bidentate ligand of phosphorus, arsenic or antimony. Although the scope of the polymerization is extensive, for purposes of illustration, a preferred Group VIII metal compound is palladium acetate, the anion is the anion of an acid selected from trifluoroacetic acid and para-toluenesulfonic acid and the bidentate ligand is selected from 1,3-bis(diphenylphosphine) propane and 1,3-bis[di(2-methoxyphenyl)phosphino]propane.

Polymerization of these polymers are typically carried out at polymerization conditions, typically at elevated temperature and pressure, in the gaseous phase or in the liquidphase in the presence of an inert diluent, e.g., a lower alkanol such as methanol or ethanol. The reactants are contacted by conventional methods such as stirring or shaking and subsequent to reaction, the polymer product is recovered as by decantation or filtration. The polymer product may contain metallic residues from the catalyst which are removed by contact with a solvent which is selective for the residues.

As already described, the structure of the preferred polymers so produced is that of a linear alternating polymer of carbon monoxide, ethylene and any second ethylenically unsaturated hydrocarbon. When terpolymers of carbon monoxide, ethylene and a second ethylenically unsaturated hydrocarbon, (e.g., a hydrocarbon of at least 3 carbon atoms), are produced, there will be at least two units incorporating moieties of ethylene per unit incorporating a moiety of the second unsaturated hydrocarbon, preferably from about 10 units to about 100 units incorporating moieties of ethylene per unit incorporating a moiety of the second unsaturated hydrocarbon. The polymer chain of the preferred class of polymers is illustrated by the formula $$\pm CO(C_2H_4)_x \pm CO-(B)_y \pm$$

wherein B is the moiety obtained by polymerization of the second ethylenically unsaturated hydrocarbon through the ethyleic unsaturation. The $-CO(C_2H_4)-$ units and the $-CO(B)-$ units occur randomly throughout the polymer molecule and the ratio of y:x is no more than about 0.5. In the modification of the invention which employs copolymers of carbon monoxide and ethylene without the presence of a second ethylenically unsaturated hydrocarbon, the term y=0 and the ratio of y:x is also 0. When terpolymers are employed, i.e., y is greater than 0, ratios of y:x from about 0.01 to about 0.1 are preferred. The end groups or "caps" of the polymer chain will depend on the particular materials present during its production and whether and how the polymer has been purified. The precise nature of the end groups is of little significance with regard to the overall properties of the polymer so that the polymer is fairly represented by the polymer chain as depicted above.

The present invention relates to a process for preparing an oxygen and/or carbon dioxide barrier polymer by a novel heat treating and cooling process. This invention relates to a laminar structure prepared form the novel barrier polymer. The invention relates to an article of manufacture, such as a container for food. The present invention was developed after examining the permeability of polyketone copolymers and terpolymers. The following Table I details the results of that analysis.

TABLE I

Permeability Values of Neat Polyketone Polymers as Measured By Shell Test Method Described Herein

| Polymer | Tm °C. | LVN | Thickness (mils) | $O_2$[1] | $CO_2$[1] | Hfus (1)[2] | Crystal[3] |
|---|---|---|---|---|---|---|---|
| Polyketone-EP Terpolymers | | | | | | | |
| 014 std[4] | 224 | 1.9 | 11.0 | 2.54 | 15.4 | 20.3 | 0.356 |
| 020 std | 221 | 1.0 | 9.2 | 3.22 | 16.6 | 22.9 | 0.402 |
| 020 std | 221 | 1.0 | 11.4 | 3.65 | 18.7 | 22.9 | 0.402 |
| 021 std | 223 | 0.7 | 7.8 | 3.77 | 26.4 | 22.4 | 0.393 |
| 022 std | 223 | 1.9 | 11.8 | 4.95 | 23.0 | 19.0 | 0.333 |
| 022 std | 223 | 1.9 | 10.1 | 3.30 | 23.1 | 19.0 | 0.333 |
| 037 std | 217 | 1.7 | 5.6 | 2.69 | 20.1 | 32.8 | 0.575 |
| 037 std | 217 | 1.7 | 12.7 | 4.57 | 27.3 | 19.1 | 0.335 |
| 037 std | 217 | 1.7 | 11.7 | 3.39 | 24.8 | 19.1 | 0.335 |
| 038 std | 214 | 1.4 | 0.8 | 8.52 | 69.9 | 19.5 | 0.342 |
| 038 std | 214 | 1.4 | 0.9 | 5.97 | 48.3 | 19.2 | 0.337 |
| 038 std | 214 | 1.4 | 0.9 | 7.29 | 57.0 | 18.0 | 0.316 |
| 038 std | 214 | 1.4 | 0.8 | 8.80 | 65.6 | 18.6 | 0.326 |
| Polyketone-E Copolymers | | | | | | | |
| 012 std | 256 | 1.4 | 9.3 | 4.65 | 29.6 | 18.3 | 0.333 |
| 012 std | 256 | 1.4 | 9.3 | 5.30 | 21.0 | 18.3 | 0.333 |
| 012 std | 256 | 1.4 | 8.0 | 4.32 | 38.4 | 18.3 | 0.333 |
| 004 std | 256 | 1.0 | 7.7 | 3.23 | 22.3 | — | — |
| 010 std | 256 | 2.2 | 11.1 | 3.66 | 25.6 | 27.7 | 0.504 |

[1]units = cc(STP)-mil/100 sqin-d-atm at 30° C.
[2]first heat of fusion from DSC heat trace, units = cal/gm.
[3]fraction crystalline calculated from Hfus(1).
[4]std = standard compression molding protocol where the polymer is heated 30–40° C. above its melt temperature and cooled rapidly by removing from mold when solidified and placed between aluminum plates.

The values described above were determined by a permeability test developed by Dr. Don Paul of the University of Texas for Shell Oil Company, U.S.A. which uses a unique device for measuring the transport properties of gases through polymer films.

The permeation of gasses through the polymer film of the present invention was measured in a specially designed diffusion cell which is detailed in FIG. 1. The experiment was set-up such that the downstream pressure was measured as a function of time. The downstream pressure was the only variable in the experimental measurement. The other parameters, such as temperature, and upstream pressure, were all controlled to be constant over the measurement time period.

The system hardware consisted of tubing, valves, known volumes, and the diffusion cell. The hardware was mounted in a Precision Thelco Model 18 forced air oven, 2, which provided a constant temperature air bath. All of the valves mounted inside the oven compartment were Nupro "H" bellows valves. These valves were chosen to eliminate the possibility of leaky valve packings as well as to provide complete shutoff. The fittings used to make tubing connections were Cajon VCR fittings that employed a stainless steel gasket to form the seal. The tubing used was standard ¼ inch outer diameter (o.d.) stainless steel tubing that was silver soldered to the VCR connectors. The silver solder joints were coated with "five minute" epoxy resin to insure a gas tight seal. The cell supported a film such that a constant high pressure test gas could be applied to one side of the film. The low pressure side of the film was designed such that pressure in a calibrated volume was measured over time. The cell 4 was constructed of two stainless steel disks 6, and 8 that bolted together much like a flange. Two viton "O" rings effectively isolated the diffusion cell cavity from the outside world on the upper (high pressure) side to the film. The lower half of the cell had a fritted metal disk for support of the film and for gas to transport to a ballast volume. Each half of the cell had two ¼ inch ports 10, 12, 14 and 16 for connection to the rest of the equipment.

The low pressure on the down stream side of the membrane was the measured value. In addition, the upstream pressure was monitored to insure that it remained relatively constant over the experimental measurement (as this was an important assumption in the data analysis). The upper cell pressure was monitored with a Sensotec strain gauge high pressure transducer (HPT), 25, that was mounted between two valves, 18 and 20, connected in series. This gauge had a range of from 0 to 1500 psi with a 0.1% span accuracy. Calibrations were performed with a Heise digital pressure indicator model 710 A, 24. The lower cell pressure was monitored with a Baratron (B) capacitance pressure gauge model 35, 22, with a pressure range of 0.0000 to 10 mm Hg and the capability to withstand a maximum temperature of 300° C. It was a factory calibrated instrument with a stated accuracy of 0.1% full scale. The only calibration required was the zero adjustment at zero pressure. This calibration was adjusted each time the temperature was changed. The system was evacuated by a vacuum system 50 consisting of a model 63 Edwards vacuum pump utilizing a dual stage rough pump and a water cooled metal oil diffusion pump capable of maintaining a vacuum of $10^{-7}$ mbar. Refrigeration fluid (50% glycol 50% water) was circulated through tracing around the diffusion pump section to condense the oil vapor in the pump. The refrigeration fluid was maintained at 10° C. using a Lauda IC-6 portable refrigeration unit and a thermomix model 1480 heavier/bath circulator. The circulator pumped the fluid from a 3 gallon bath, around the condenser section of the pump and returned the fluid to the bath.

Temperature was a controlled parameter in the oven 2. This measurement was important because gas transport parameters are known to be highly temperature dependent. To maintain a constant temperature (±0.05° C.), the cell and down stream volumes were isolated in an air bath. All temperatures were monitored with type J (iron constantan) thermocouples, 26 whose signals were detected and recorded by a Kay Instruments Digistrip B 4 data logger 28. The oven contained a 1100 watt radiant heater 30 which was controlled by a Barber Coleman PID temperature controller 32. A forced air blower 34 brought air from the oven compartment, past the heater in the bottom, and returned the air through louvers 36 in the sides of the oven. When operating at a temperature close to or below ambient temperature, (room temperture), cooling air was supplied by passing air through a coil of copper tubing located in the refrigeration bath and out through an insulated line leading to the oven compartment.

The other controlled parameters were the upstream and down stream volumes. The upper manifold consisted of a ¼ inch outer diameter (o.d.) stainless steel tube that was connected to one of the two ports in the top of the cell. The line entered the side of the oven and connected to a valve 20. This valve 20 acted as the main isolation valve for the high pressure side. The outlet of valve 20 was connected to a "T" 38. One leg of the "T" lead to the strain gauge transducer 25. The other leg of the "T" was connected to valve 18. These two valves allowed the transducer to be isolated (and calibrated) while a run was in progress. The outlet of valve 18 lead directly to the cell 4 through port 10. A 1000 psi rupture disk 62 was attached to port 12 on the cell 4. The film to be measured in the cell acted as the final "barrier" separating the upper and lower volumes. The lower volume of the cell 4 consisted of a ¼ o.d. stainless steel tube attached to port 14 at the one end and on the other end, a "T" 40. One leg of "T" 40 lead to valve 42 the outlet of which was attached to the Baratron gauge 22. This valve 42 was used to isolate the gauge during removal of the cell. The other leg of the "T" 40 was connected to a ¼ o.d. line that lead to another "T" 44. One leg of this "T" 44 was attached to a 300 cc pressure vessel 46 acting as a ballast volume. The other leg of the "T" 44 was connected to a line which lead to valve 48. The outlet of this valve 48 lead to the vacuum system 50 and served as an isolation valve for cell 4. The total volume of lower cell between valve 48 and the membrane in cell 4 was about 329.0+0.1 cc.

The data was received and recorded by a Kaye Digistrip 4 indicated as 28. Information in the form of voltage signals was input to the logger from thermocouples 26 and transducer 25 (optionally manipulated by a strain gauge conditioner 52) and was further manipulated by programming the logger to perform the calculations necessary to present the data in a usable form. Internal timers allowed data to be recorded and transmitted at any rate limited only by the amount of time needed to scan the input banks (approximately 1 sec). The logger was directly wired to an IBM personal computer 54 via a cable 56. KDAWS, a software package supplied by Kaye Instruments allowed data to be transferred to the IBM for archiving and further manipulation by LOTUS 123 software. Additional valves 66, 68, 58, and 60 can be used in this diffusion cell. Cell 4 can be vented through port 12 to an opening 64 through a rupture disc 62.

Polymer films to be measured on this equipment were about 3 inches in diameter and between 1 and 30 mils thick, with only minor variations in thickness. Prior to placing the film in the uniquely designed diffusion cell, an area for diffusion was defined by masking a portion of the test film with an adhesive backed aluminum foil. Mocon Inc. supplies masks with cut-outs of 5 square centimeters (part number 130-015:02). Before attaching the mask to the film, a circle was scribed on the mask that waas 3.0 inches in diameter. The mask was then attached to the film (in such a manner as to prevent air from being trapped between the film and the mask). The masked film was then trimmed such that it fit inside the outermost groove of the upper cell. This assembly allowed the "O" ring to seal entirely on the film surface. With the two halves of the cell separated, the masked film was placed in the upper half such that the unmasked side of the film resting against the "O" ring. The film was centered such that the edges did not overlap the 0.002 inch step in the cell. A piece of perforated filter paper was cut to fit the circle in the foil mask. This protected the film by preventing it from being deformed by the metal frit on the lower cell. The bottom half of the cell was placed on the upper half ensuring that the masked film and filter paper support remained in their proper orientation. The cell was then assembled by bolting the halves together. Once bolted together the cell was then mounted in an oven and connected to the appropriate manifolds. The cell and membrane were then degassed by pulling a vacuum on the entire system for one to two days prior to performing the desired measurement. Prior to making a measurement, the pressure measuring devices were calibrated.

Although the system was designed to be very tight with respect to leaks from the outside, leaks on the order of 1 to 2 microns Hg per hour at 35° C. sometimes occurred. This level of leaking could cause error in the permeation calculation of barrier polymers. To account for this leak rate in the calculation, a leak test was made for a suitable length of time. A leak rate was measured by isolating the upper and lower portions of cell 4 shown in FIG. 1 from the vacuum system by closing valves 48 and 20. The run was begun by engaging the elapsed timer and recording the lower cell pressure increase as a function of time. The slope of the curve generated by plotting lower cell pressure against time was the leak rate. This plot resulted in a straight line. Significant curvature could indicate cell contamination or polymer degradation. This value for the leak rate (units of mm Hg/Hour) was used to automatically correct the lower cell pressure value for leaking from the outside.

In making a diffusion measurement, the lower cell volume of cell 4, lower cell 6 was isolated from the vacuum source by closing valve 48. The system timer was engaged. The upper cell of cell 4, 8 was isolated by closing valve 60. The test gas was introduced slowly to the upper cell by throttling valve 54. When the desired pressure was reached, the gas source was isolated and valve 20 was closed to isolate the system.

This system measures permeation and diffusion of carbon dioxide and oxygen through polymeric films. If this transport is assumed to be Fickian diffusion, then the time dependent diffusion through the film should follow Fick's equation in one dimension assuming a linear sorption isotherm C=SP where S=solutiblity coefficent and P=pressure:

$$\frac{dc}{dt} = \frac{d}{dx}\left(D\frac{dc}{dx}\right) \quad (1)$$

where c is the gas concentration in the film, t is time of experiment, x is distance along the film, and D is the diffusion coefficient.

For experimental conditions, the initial condition was zero concentration throughout the film, $$t<0, 0<x<1 \; c=0 \quad (2)$$

(where 1 was the thickness of the film.)

The boundary conditions were constant concentration ($C_O$) on the upstream side and known (measured=f(t)) concentration on the downstream side of the membrane:

$$t > 0, x = 0 \quad c = C_0 \text{ or } SP_o \quad (3)$$

$$t > 0, x = 1 \quad c = f(t) = 0 \quad (4)$$

The solution to Fick's equation is well known. The flux (Q) i.e. the total amount of material which has passed through the membrane in time t, through the film is given by the equation:

$$\frac{Q}{lC_o} = \frac{Dt}{l^2} - \frac{1}{6} - \frac{2}{\pi^2}\sum_{1}^{\infty}\frac{(-1)^n}{n^2}\exp(-Dn^2\pi^2 t/l^2) \quad (5)$$

From this equation, the diffusion coefficient can be estimated from a 'time lag'. For long times, equation (5) reduces to a steady-state flux ($Q_{ss}$). The time axis intercept of the steady-state part of this solution is the 'time lag' theta ($\theta$). Theta can be used to determine the diffusion coefficient.

$$\theta = l_2/6D \quad (6)$$

The permeation coefficient (P) is the steady-state flux from this curve $$PP_o/l = \left.\frac{dQ}{dt}\right|_{ss} \quad (7)$$

$$P = \frac{Q_{ss}l}{P_o} \rightarrow P = \frac{l}{P_o}\left.\frac{dQ}{dt}\right|_{ss}$$

where $P_o$ is the high pressure value. By definition, the sorption coefficients can be calculated from these two values $$S = P/D \quad (8)$$

In calculating the data, a line drawn along the constant slope portion of the curve to the time axis gives the time lag intercept. The flux is measured from the slope of this straight line. The above-described test methods were used to determine the barrier properties of films and materials discussed herein.

Comparisons between polyketone polymers which have not yet been heat treated and other polymers reveal the differences in oxygen and carbon dioxide barrier properties.

TABLE II

Gas Transport Properties of Carbon Dioxide in Several Polymers As Measured By Shell Test Described Herein.

| Polymer | D | S | P |
|---|---|---|---|
| Polyketone-EP Terpolymer[1] | 00.64 | 0.037 | 39.4 |
| Saran-H—B[2] | 03.02 | 0.0004 | 01.91 |
| EVAL-F[3] | 00.42 | 0.0001 | 00.05 |
| Polyethylene terephthalate[4] | 15.1 | 0.0026 | 64.6 |
| Polyvinyl Chloride[5] | 02.09 | 0.0043 | 15.1 |

D = diffusion coefficient $10^{-9}$ cm$^2$/s
S = sorption coefficient (level of dissolved gas at equilibrium) cm$^3$ (STP)/cm$^3$ · cm Hg
P = permeability coefficient cm$^3$ (STP) - mil/100 sqin-d-atm; wherein D, S, and P are related by P = DS
[1] Polyketone-ethylene-propylene terpolymer with 218 m.p. made by Royal Dutch Shell
[2] Available from Dow Chemical Company
[3] Ethylene vinyl alcohol copolymer available from EVALCA Co.
[4] Film from National Bureau of Standards, commercially available as Mylar ™ from Dupont
[5] Available from Dow Chemical Company

TABLE III

Gas Transport Properties of Oxygen in Several Polymers As Measured by Shell Test Method Described Herein

| Polymer | P |
|---|---|
| Polyketone Copolymer[1] | 4.5 |
| Saran-H—B[2] | 0.5 |
| EVAL-F[3] | 0.1 |
| Polyethylene terephthalate[4] | 8.5 |
| Barex[5] | 1.8 |

[1] Polyketone-ethylene-propylene terpolymer with 218 m.p. made by Royal Dutch Shell
[2] Available from Dow Chemical Company
[3] Ethylene vinyl alcohol copolymer available from EVALCA Co.
[4] Film from National Bureau of Standards, commercially available as Mylar ™ from DuPont
[5] An acrylonitrile styrene copolymer available from British Petroleum It has been discovered that by subjecting solution cast polyketone polymers to defined heating conditions and then cooling those polymers at certain rates, novel polyketone-based barrier materials can be prepared.

Beneficial barrier properties for certain polyketone polymer materials have been developed with a unique heat treatment and cooling process. This novel process involves a particular type of heat treatment in combination with a particular cooling rate for the heated polymer. This novel heat treatment procedure can be accomplished by heating the polymer, at least once, to a temperature below the melting point of the polymer and then cooling the polymer at a moderate cooling rate.

Heat treatment increases crystallinity of the polymer to values up to 75% vol. The novel heat treated polymer provides advantages in that, as it is heated, it becomes structurally sturdy, then, with a certain moderate rate of cooling, the resulting crystalline structure provides tortuous paths for gas transmission, forming a surprising and unexpected barrier material for oxygen and carbon dioxide transmission.

The polymers usable in the present invention are linear alternating copolymers of carbon monoxide and ethylene or linear alternating terpolymers of carbon monoxide ethylene and propylene. These copolymers and terpolymer are produced in the presence of a catalyst composition formed from palladium acetate, the anion of trifluoroacetic acid and 1,3-bis[di(2-methoxyphenyl)phosphino]propane.

The melting points of the copolymers produced by this catalyst ranged from 240°–260° C. with limiting viscosity numbers of 1.1 to 3.5, and in a most preferred embodiment were 256° C. with a limiting viscosity number (LVN) of about 1.75. The melting points of the terpolymers produced by this method ranged from 180°–230° C. with LVN's of 1.1 to 3.5 with a most preferred embodiment having a melting point of 220° C. and an LVN of 1.75 (with LVN's measured at 60° in m-cresol).

The polyketone polymer films of the present invention can be cast from a solution prepared with a blend of hexafluoroisopropanol (HFIPA) and a member of the group: methanol (MEOH), butanol, propanol, isopropyl alcohol (IPA), and ethanol, or mixtures thereof, using copolymers and terpolymers as described above in amounts sufficient to form up to a 17wt% polymer solution. It is contemplated that the solution can be in the range between 2–15wt%, with the most preferred solution being 5.5wt%. It is contemplated that solutions prepared from HFIPA and a member of the group: IPA, MEOH, butanol, propanol, ethanol, isopropanol, and mixtures thereof can range in parts from 99:1 to 60:40 parts based on a 100 part solution.

The solution casting can be carried out by disposing the formed solution on a glass plate, using a Gardner knife to evenly cast the solution over the plate. The solution should be left on the plate for a time sufficient to allow the solvent mixture to evaporate, leaving the polymer disposed on the plate. In a preferred embodiment, a solution 84/16 HFIPA/MEOH and 5.5 wt% polymer was disposed on a glass plate placed in an air oven at a temperature between about 20°–40° C. for about 20 minutes to evaporate the solvent mixture. After the solvent mixture was evaporated, the plate was immersed in water to separate the film from the plate. The film was removed from the water bath and placed in a vacuum oven to remove any remaining water. The resulting film appeared homogeneous to the eye.

Measurements of melting points and crystallization temperatures, or alternatively heats of melting and heats of fusion, for the films of the present invention were made by the use of a Perkin-Elmer DSC 7 differential scanning calorimeter (DSC) which employs samples of polymer or polymer composition in sealed pan containers. The pan and contents were heated at a controlled rate, typically 20°C./minute, until the sample solidified and then heated, past a second melting point, to about 285° C., at which temperature the sample was maintained for about 10 minutes. The pan and contents were then cooled until the sample solidified a second time.

The melting and crystallization temperatures are defined as the temperatures at which the heat flow reaches a maximum (for melting) or a minimum (for crystallization). Typically the melting point, Tm, will be higher than the crystallization temperature, Tc. Although a number of factors influence the melting point and crystallization temperature, these values are also influenced by the crystallinity of the polymer. In general, the smaller the difference between the first and second melting points, the greater the degree of retained crystallinity. The same relationship is generally true for the crystallization temperatures. The higher the degree of retained crystallinity the better the melt stability of the composition.

The films produced in accordance with the preferred method, were tested for diffusion, sorption, and permeability to oxygen and carbon dioxide. The results of the tests on an Illustrative Embodiment prepared by the preferred method so described are are give in Table IV.

TABLE IV

| | Solution Cast Polyketone Polymer Illustrative Embodiment I | | | |
|---|---|---|---|---|
| Preparation | Anneal Temp | Hfusl | P—$O_2$[1] | P—$CO_2$[2] |
| Solution cast film[3] | — | 35 | 30 | 60 |

All heat of fusion data expressed in cal/gm
All permeability data expressed in CC(STP)-mil/100 sq in-d-atm
[1]is the permeation value of oxygen
[2]is the permeability of carbon dioxide
[3]is a 5 wt % solution cast polyketone-ethylene copolymer with the melting point of 256° C. formed using an 84/16 HFIPA to MEOH vol % solution The cast film initially gave a high value of oxygen and carbon dioxide permeability value.

To improve the barrier properties of the solution cast film of Illustrative Embodiment I, the film was heated to a temperature below the melting point of the copolymer. For this solution cast film, the melting point of the copolymer was 256° C. The film was heated to a temperature of 246° C., that is, 10° C. below the melting point of the polymer. It is contemplated that the polymer can be heated to a temperature in the range between about 5° C. and about 20° C. below the melting point of the copolymer and that after heating, the polymer is cooled at a moderate cooling rate, (to be described herein) and accordingly result in an improved polyketone barrier film.

The heating of the solution cast film was carried out in a gas chromatograph oven in a nitrogen bath. Heating was carried out for about 20 seconds at 246° C., after engaging the oven for a short warm-up period, which required about a minute.

The moderate cooling rate referred to herein is defined as a rate of cooling between about 6° C. and about 10° C. per minute using controlled cooling, such as with a water bath or an air bath. This moderate rate of cooling provided the best oxygen permeability and crystallinity percent for the solution cast polyketone film of Embodiment I. Cooling the heated film of Illustrative Embodiment I with an air or water bath at a rate of about 6° C. to about 10° C. per minute resulted in a permeability value for oxygen in the film of 0.8. Cooling this film at a rate of about 1° C. per minute, (the slowest cooling rate), yielded a permeability value for oxygen at 4.7. In contrast, when rapid quenching was performed on the film of Illustrative Embodiment I, at a rate of about 20° C. to about 40° C. per minute the permeability value for oxygen was 5.46. These oxygen permeability values were determined using the testing method described herein and were performed at room temperature.

During the initial heat treatment, the solution cast film can be subjected, for short time periods, to temperatures just below the melting point of the polymer material, i.e. temperature which ranges between about 200° C. and about 256° C. It is most preferred to heat treat the polymer 60° to 10° C. below the melting point of the polymer to remove microvoids in the polymer. The absence of microvoids is indicated by the film's permeability ratio of carbon dioxide to oxygen in the 6-10 range. The permeability results for the heat treated polyketone films appear in Table V.

TABLE V

| Preparation | First Heat Treatment Temp | Hfusl | P—$O_2^1$ | P—$CO_2^2$ |
| --- | --- | --- | --- | --- |
| Illustrative Embodiment I Solution cast film | — | 35 | 30 | 60 |
| Solution cast film of Illustrative Embodiment I | 200° C. | 35 | 4.5 | 25 |
| Solution cast film of Illustrative Embodiment I | 245° C. | 39 | 0.7 | 4.5 |

All heat of fusion data expressed in cal/gm
All permeability data expressed in CC(STP)-mil/100 sq in-d-atm
[1] is the permeation value of oxygen
[2] is the permeability of carbon dioxide As Table V shows, the solution cast films subjected to the heat treatment at 200° C. appear to exhibit Fickian transport (as the ratio is in the 6-10 range). The film heated to 245° C. resulted in a film of much higher crystallinity and a much lower permeability. This value of permeability is in the range of the common barrier polymers for gas transport (Saran ™, available from Dow Chemical Company and Barex ™, available from British Petroleum).

Within the scope of the present invention, it has been determined that heat treating the polymer material a second time, to a temperature just below the melting point of the polymer, can be performed to provide a film with improved barrier properties.

Additional components may optionally be added to the polymer formulation to enhance certain properties of the barrier material or reduce the cost for preparing the material. It is contemplated that nucleating agents, additives to enhance orientation of tortuous diffusion of permeated species through the material, additional hardeners, fillers, extenders, fortifiers, carriers, and substances to enhance the amorphous density of the polymer, preservatives of the type known to the art, and mixtures thereof may be added.

The novel barrier film, can be disposed on a variety of substrates, such as a different polymer like polypropylene, polycarbonate or ceramic composites.

Suitable applications of the novel barrier materials of this invention are in the fields of packaging, such as film or sheet materials usable to contain food. It is also contemplated that the material be injection molded or blow-molded into containers, and similar articles of manufacture.

The above examples are not intended to limit the scope of the invention.

What is claimed is:

1. A process for preparing a polymer material having improved oxygen and carbon dioxide barrier properties comprising the steps of:
   blending together hexafluoroisopropanol and a member selected from the group consisting of methanol, ethanol, isopropyl alcohol, butanol, and mixtures thereof, in a ratio of vol% ranging from 99:1 to 60:40;
   adding a quantity of a linear alternating polymer of carbon monoxide and at least one ethylenically unsaturated hydrocarbon to form up to a 17wt% solution of said polymer;
   casting said solution forming a solution cast film;
   heating said solution cast film to a temperature in the range from about 20° C. to below to about 0° C. below the melting point of the polymer; and
   cooling said heated solution cast film at from about 6° C. to about 10° C. per minute.

2. The process of claim 1, wherein after said film is cooled, said film is heated to a temperature from about 0° C. to about 20° C. below the melting point of the polymer and cooled at a moderate cooling rate.

3. The process of claim 1, wherein said linear alternating polymer is of the formula:

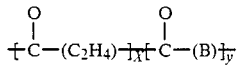

wherein B is the moiety of an ethylenically unsaturated α-olefin of at least 3 carbon atoms polymerized through the ethylenic unsaturation, the ratio of y:x is no more than about 0.5.

4. The process of claim 3, wherein the α-olefin is propylene and the ratio of y:x is from about 0.01 to about 0.2.

5. The process of claim 1, further including the step of adding a member selected from the group consisting of:
   a filler, a hardener, an extender, a fortifier, a carrier, a preservative, a substance to enhance the amorphous density of the polymer material, a nucleating agent and mixtures thereof,
   to the solution prior to solution casting.

6. The process of claim 1, wherein hexafluoroisopropanol and methanol are blended together in the proportion 84:16 vol%.

* * * * *